(12) United States Patent
Abhishek Raja et al.

(10) Patent No.: US 11,748,101 B2
(45) Date of Patent: Sep. 5, 2023

(54) HANDLING OF SINGLE-COPY-ATOMIC LOAD/STORE INSTRUCTION WITH A MEMORY ACCESS REQUEST SHARED BY MICRO-OPERATIONS

(71) Applicant: Arm Limited, Cambridge (GB)

(72) Inventors: Abhishek Raja, Austin, TX (US); Albin Pierrick Tonnerre, Nice (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/374,149

(22) Filed: Jul. 13, 2021

(65) Prior Publication Data

US 2023/0017802 A1 Jan. 19, 2023

(51) Int. Cl.
*G06F 9/312* (2018.01)
*G06F 9/30* (2018.01)
*G06F 9/38* (2018.01)

(52) U.S. Cl.
CPC ........ *G06F 9/30043* (2013.01); *G06F 9/3017* (2013.01); *G06F 9/30145* (2013.01); *G06F 9/3836* (2013.01)

(58) Field of Classification Search
CPC ............. G06F 9/30043; G06F 9/30101; G06F 9/30145; G06F 9/3017; G06F 9/3836
See application file for complete search history.

(56) References Cited

U.S. PATENT DOCUMENTS

| | | | |
|---|---|---|---|
| 6,502,187 B1* | 12/2002 | Miyagawa | G06F 9/30181 712/225 |
| 11,314,509 B2* | 4/2022 | Abhishek Raja | G06F 9/3865 |
| 2004/0216104 A1* | 10/2004 | Fluhr | G06F 9/3004 712/E9.046 |
| 2011/0202729 A1* | 8/2011 | Bohizic | G06F 9/3865 711/E12.079 |
| 2011/0202748 A1* | 8/2011 | Jacobi | G06F 9/30163 712/225 |
| 2017/0031865 A1* | 2/2017 | Eyole | G06F 9/30032 |
| 2017/0286113 A1* | 10/2017 | Shanbhogue | G06F 9/3004 |
| 2018/0349138 A1* | 12/2018 | Guthrie | G06F 9/3834 |

* cited by examiner

*Primary Examiner* — David J. Huisman
(74) *Attorney, Agent, or Firm* — NIXON & VANDERHYE P.C.

(57) ABSTRACT

In response to a single-copy-atomic load/store instruction for requesting an atomic transfer of a target block of data between the memory system and the registers, where the target block has a given size greater than a maximum data size supported for a single load/store micro-operation by a load/store data path, instruction decoding circuitry maps the single-copy-atomic load/store instruction to two or more mapped load/store micro-operations each for requesting transfer of a respective portion of the target block of data. In response to the mapped load/store micro-operations, load/store circuitry triggers issuing of a shared memory access request to the memory system to request the atomic transfer of the target block of data of said given size to or from the memory system, and triggers separate transfers of respective portions of the target block of data over the load/store data path.

15 Claims, 8 Drawing Sheets

HANDLING OF SINGLE-COPY-ATOMIC LOAD/STORE INSTRUCTION WITH A MEMORY ACCESS REQUEST SHARED BY MICRO-OPERATIONS

BACKGROUND

Technical Field

The present technique relates to the field of data processing. More particularly, it relates to handling of load/store operations.

Technical Background

In a processing apparatus, load/store operations are operations for transferring data between registers and a memory system. These may include load operations which load data from the memory system to the registers and store operations which store data from the registers to the memory system.

SUMMARY

At least some examples provide an apparatus comprising: instruction decoding circuitry to decode instructions to generate micro-operations; and processing circuitry to perform data processing operations in response to the micro-operations; in which: the processing circuitry comprises load/store circuitry to process load/store micro-operations for transferring data between registers and a memory system, the load/store circuitry having a load/store data path to receive store data read from at least one register in response to a store micro-operation or to output load data to be written to at least one register in response to a load micro-operation; in response to a single-copy-atomic load/store instruction for requesting an atomic transfer of a target block of data between the memory system and the registers, where the target block has a given size greater than a maximum data size supported for a single load/store micro-operation by the load/store data path, the instruction decoding circuitry is configured to map the single-copy-atomic load/store instruction to a plurality of mapped load/store micro-operations each for requesting transfer of a respective portion of the target block of data; and in response to the plurality of mapped load/store micro-operations mapped from the single-copy-atomic load/store instruction by the instruction decoding circuitry, the load/store circuitry is configured to: trigger issuing of a shared memory access request to the memory system to request the atomic transfer of the target block of data of said given size to or from the memory system, where the shared memory access request is shared between the plurality of mapped load/store micro-operations; and trigger separate transfers of respective portions of the target block of data over the load/store data path in response to the plurality of mapped load/store micro-operations.

At least some examples provide a method comprising: decoding instructions to generate micro-operations; and performing data processing operations in response to the micro-operations, using processing circuitry comprising load/store circuitry to process load/store micro-operations for transferring data between registers and a memory system, the load/store circuitry having a load/store data path to receive store data read from at least one register in response to a store micro-operation or to output load data to be written to at least one register in response to a load micro-operation; in which: in response to a single-copy-atomic load/store instruction for requesting an atomic transfer of a target block of data between the memory system and the registers, where the target block has a given size greater than a maximum data size supported for a single load/store micro-operation by the load/store data path, the single-copy-atomic load/store instruction is mapped to a plurality of mapped load/store micro-operations each for requesting transfer of a respective portion of the target block of data; and in response to the plurality of mapped load/store micro-operations mapped from the single-copy-atomic load/store instruction, the method comprises: triggering issuing of a shared memory access request to the memory system to request the atomic transfer of the target block of data of said given size to or from the memory system, where the shared memory access request is shared between the plurality of mapped load/store micro-operations; and triggering separate transfers of respective portions of the target block of data over the load/store data path in response to the plurality of mapped load/store micro-operations.

At least some examples provide a non-transitory computer-readable medium to store computer-readable code for fabrication of an apparatus comprising: instruction decoding circuitry to decode instructions to generate micro-operations; and processing circuitry to perform data processing operations in response to the micro-operations; in which: the processing circuitry comprises load/store circuitry to process load/store micro-operations for transferring data between registers and a memory system, the load/store circuitry having a load/store data path to receive store data read from at least one register in response to a store micro-operation or to output load data to be written to at least one register in response to a load micro-operation; in response to a single-copy-atomic load/store instruction for requesting an atomic transfer of a target block of data between the memory system and the registers, where the target block has a given size greater than a maximum data size supported for a single load/store micro-operation by the load/store data path, the instruction decoding circuitry is configured to map the single-copy-atomic load/store instruction to a plurality of mapped load/store micro-operations each for requesting transfer of a respective portion of the target block of data; and in response to the plurality of mapped load/store micro-operations mapped from the single-copy-atomic load/store instruction by the instruction decoding circuitry, the load/store circuitry is configured to: trigger issuing of a shared memory access request to the memory system to request the atomic transfer of the target block of data of said given size to or from the memory system, where the shared memory access request is shared between the plurality of mapped load/store micro-operations; and trigger separate transfers of respective portions of the target block of data over the load/store data path in response to the plurality of mapped load/store micro-operations.

Further aspects, features and advantages of the present technique will be apparent from the following description of examples, which is to be read in conjunction with the accompanying drawings.

DESCRIPTION OF EXAMPLES

Figure 1:
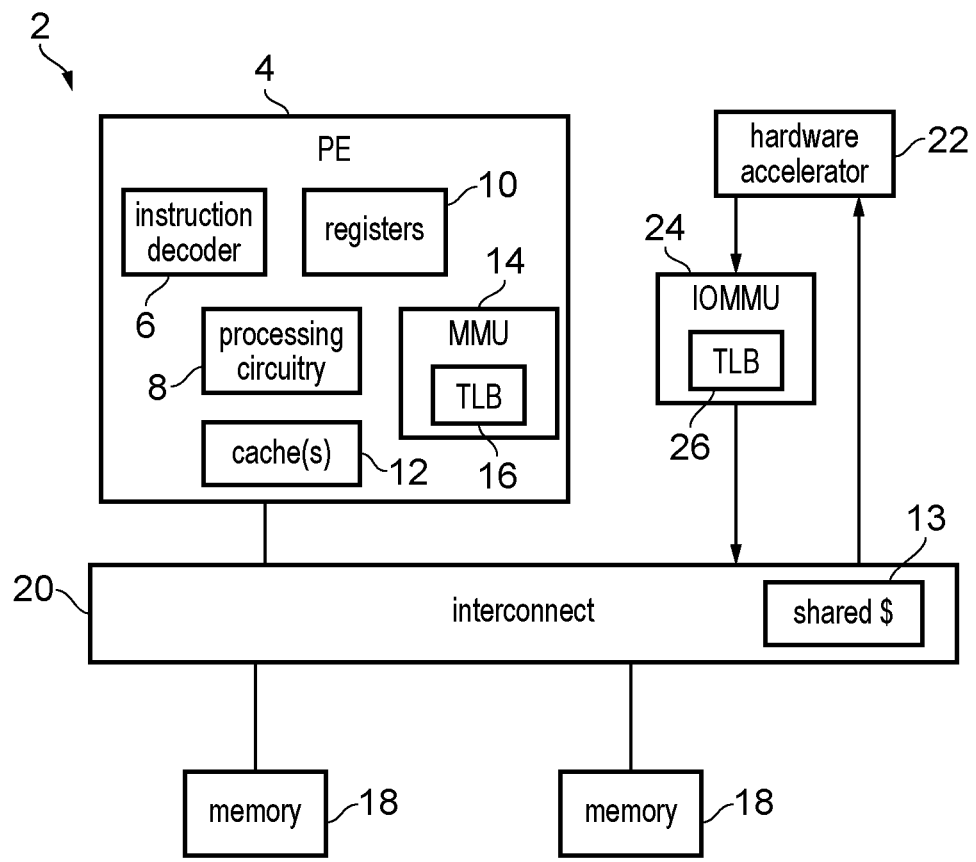
FIG. 1 schematically illustrates an example of a data processing system.

An apparatus has instruction decoding circuitry to decode instructions to generate micro-operations (uops), and processing circuitry to perform data processing operations in response to the uops. The processing circuitry comprises load/store circuitry to process load/store uops for transferring data between registers and a memory system. The load/store circuitry has a load/store data path to retrieve store data read from at least one register in response to a store uop or to output load data to be written to at least one register in response to a load uop.

The instruction decoding circuitry and processing circuitry support processing of a single-copy-atomic load/store instruction for requesting an atomic transfer of a target block of data between the memory system and the registers. The single-copy-atomic load/store instruction could be a single-copy-atomic load instruction for requesting an atomic transfer of the target block of data from the memory system to the registers, or a single-copy-atomic store instruction for requesting an atomic transfer of the target blocking data from the registers to the memory system. It is possible to provide single-copy-atomic load/store instructions which act on a target block of data of a relatively large size. This can be useful for supporting access to hardware accelerators, for example, although software developers may also find other use cases for the instruction.

However, the load/store data path of some processor designs may be narrower than the size of the target block of data accessed by the single-copy-atomic load/store instruction. One approach for supporting the single-copy-atomic load/store instruction could be to expand the maximum data size supported for a single load/store micro-operation by the load/store data path via which data is read from registers or written to registers, but this may require extra hardware cost in providing the wider data path, which may not be considered justified as the majority of load/store instructions other than the single-copy-atomic load/store instruction may not make use of this wider data path size.

In the examples discussed below, the target block of data requested to be transferred by the single-copy-atomic load/store instruction has a given size which is greater than the maximum data size supported for a single load/store uop by the load/store data path. In response to the single-copy-atomic load/store instruction, the instruction decoding circuitry maps the single-copy-atomic load/store instruction to a plurality of mapped load/store uops each for requesting transfer of a respective portion of a target block of data between the memory system and the registers. In response to the plurality of mapped load/store uops that were mapped from the single-copy-atomic load/store instruction by the instruction decoding circuitry, the load/store circuitry is configured to: trigger issuing of a shared memory access request to the memory system to request the atomic transfer of the target block of data of said given size to or from the memory system, where the shared memory access request is shared between the plurality of mapped load/store micro-operations; and trigger separate transfers of respective portions of the target block of data over the load/store data path in response to the plurality of mapped load/store micro-operations.

Hence, this allows the single-copy-atomic load/store instruction to be supported without having to expand the maximum data size supported by the load/store data path used to read and write data from or to registers, and so this reduces the amount of additional hardware cost needed to support the single-copy-atomic load/store instruction. Nevertheless, although from the point of view of the load/store circuitry, the load/store circuitry received separate uops corresponding to the same single-copy-atomic load/store instruction, the load/store circuitry controls issuing of a shared memory access request, shared between the plurality of mapped load/store uops, to request the atomic transfer of the target block of data of the given size to or from the memory system. As a single shared request can be issued in response to the group of mapped load/store uops, this enables the data transfer of the target block of data to be carried out atomically. However, the transfers of respective portions of the target block of data over the load/store data path to or from the registers can be carried out separately in response to the plurality of mapped load/store uops so that the different portions of the target block can be provided over the narrower load/store data path in a number of separate transfers to conserve hardware cost. Hence, this approach enables the atomic nature of the instruction to be respected but with less hardware cost of implementing the load/store circuitry.

The single-copy-atomic status of the load/store instruction described above may mean that the atomic transfer of a target block of data is seen as indivisible as observed by other observers of the memory system locations corresponding to the addresses of the target block of data specified by the single-copy-atomic load/store instruction. In other words, the outcome of the single-copy-atomic load/store instruction is consistent with the outcome that would be achieved if the target block of data was loaded or stored as a single copy of data read or written at a single instance in time, even if the actual handling of the transfer involves some separate reads or writes which may occur at different timings.

For example, if the single-copy-atomic load/store instruction is a store instruction, the single-copy-atomic store instruction may request that the target block of data is written to the memory system from registers, and the effect of the instruction may be such that if another request is made to access any of the memory system locations associated with addresses corresponding to the target block of data, then those other memory accesses either see the old value of the data at those addresses prior to executing the single-copy-atomic load/store instruction, or see the new values of the target block of data transferred in response to the single-copy-atomic load/store instruction, but it is not possible for another observer of the updated memory system locations to see a partial update where some of those locations have the old values before the update and other of those locations have the new value resulting from the update. On the other hand, if the single-copy-atomic load/store instruction is a load instruction requesting an atomic transfer of a target block of data from the memory system to the registers, then relative to a given store operation to update data associated with any part of the target block of data, the value returned by the single-copy-atomic load instruction can be consistent with either that other store not being performed at all or the other store being performed completely so that the load sees either none of the effects of the other store or the full effects of the other store but cannot see only partial effects of the other store operation.

The particular way in which the memory system ensures that the single-copy-atomic requirement is satisfied may vary significantly from one implementation to another. For example, some implementations could implement atomic transfers so that access to the addresses associated with the target block of data is locked while performing the atomic transfer in response to the single-copy-atomic load/store instruction, preventing intervening updates or reads to the target block of data between the first and the last of the load/stores to portions of the target block of data, in cases where the target block of data is larger than the maximum size that can be updated in a single action by the memory system.

Alternatively, other implementations could use a different approach where intervening accesses to addresses associated with a target block of data are permitted while carrying out an atomic transfer, but a tracking mechanism is provided to detect whether any accesses to the addresses associated with a target block of data have been encountered between starting the first portion of the atomic transfer and finishing the last portion of the atomic transfer, so that the atomic operation can be aborted and repeated later if it is detected that there is a risk of loss of atomicity.

The features of the instruction decoding circuitry and processing circuitry described in this application focus on the handling of the single-copy-atomic load/store instruction within the processing element which has the instruction decoding circuitry for decoding instructions, up to the point where requests are issued to the memory system to request that the atomic transfer is performed. It will be appreciated that the same processing element could be used in conjunction with a wide range of different memory devices which may operate in different ways and so a specific way of handling those memory requests or guaranteeing atomicity at the memory system is not an essential feature of the claimed technique.

Nevertheless, providing processing circuitry which supports handling of single-copy-atomic load/store instructions of the type discussed here can be particularly useful for configuring hardware accelerators or other virtualised devices. For example, a single-copy-atomic store instruction could be used to write command data to addresses associated with a device and so it may be important that the device does not see a partial update of the relevant memory system locations as that could risk the command being incorrectly interpreted as a completely different command to the one intended. Similarly, on reading a block of data associated with a virtualised device or hardware accelerator it may be important that any preceding updates to that data are fully observed and it is not possible to see a partial update resulting from another store to the relevant memory system locations.

The single-copy-atomic load/store instruction may specify an address operand for calculating an address of the target block of data. When mapping the instruction to the mapped load/store micro-operations, the instruction decoding circuitry may generate adjusted address operands, which are derived from the address operand of the single-copy-atomic load/store instruction, to indicate that the mapped load/store uops are to request transfer of respective portions of the target block of data. For example, an offset between addresses indicated by the adjusted address operands for two successive mapped load/store uops of the group of mapped load/store uops generated in response to single-copy-atomic load/store instruction may be selected to correspond to the maximum data size supported for a single load/store uop by the load/store data path. Hence, the instruction decoder can adjust the addresses of the mapped load/store uops to allow them to fit within the data size limitations of the load/store data path while providing an equivalent result to that required by the single-copy-atomic load/store instruction.

Also, the single-copy-atomic load/store instruction may specify a destination/source register specifier, and may indicate that the target block of data is to be transferred to or from a group of registers having register specifiers derived from the destination/source register specifier. If the instruction is a load instruction then the specified registers may be destination registers to which load data is written, and if the instruction is a store instruction then the specified group of registers may be source registers from which store data is read. In some examples, the single-copy-atomic load/store instruction may specify a single register specifier and it may be implicit that the group of multiple registers to be used for reading or writing the target block of data may be a group of registers including the register identified by the single register specifier and a number of further registers having consecutive register specifier numbers following on from the register specifier number specified as the destination/source register specifier.

In response to the single-copy-atomic load/store instruction, the instruction decoding circuitry may generate adjusted destination/source register specifiers for the mapped load/store uops, derived from the destination/source register specifier of the single-copy-atomic load/store instruction. These adjusted destination/source register specifiers indicate that the mapped load/store uops are to request transfer of respective portions of the target block of data to or from different destination/source registers. Hence, the instruction decoding circuitry can automatically adjust the registers specified by the respective uops so that collectively they read or write to the same group of registers that is targeted by the single-copy-atomic load/store instruction.

It will be appreciated that the single-copy-atomic load/store instruction may specify an architectural register specifier as the destination/source register specifier, and from an architectural point of view the group of registers used for reading or writing of the target block of data may be a group of registers with consecutive architectural register numbers. However, in some processor implementations which employ out-of-order processing, the pipeline may rename architectural register numbers to physical register numbers identifying physical registers provided in hardware, so that the physical registers accessed in response to the mapped load/store uops need not necessarily have consecutive physical register specifier numbers, depending on the register mapping currently being used for register renaming.

The apparatus may have address translation circuitry to perform address translation. In response to the mapped load/store uops, the load store circuitry may request that the address translation circuitry performs an address translation for one of the plurality of mapped load/store uops (e.g. the first received mapped load/store uop of the plurality of mapped load/store uops), and may skip requesting address translations for remaining mapped load/store uops of the plurality other than the one mapped load/store uop for which the address translation is requested. This may exploit the fact that the single-copy-atomic load/store instruction may be architecturally defined to require the target block of data to correspond to addresses within the same page of an address space so that all of the mapped load/store uops can share the same address translation. For example, the single-copy-atomic load/store instruction may architecturally be required to trigger a fault if the target block of data spans the boundary between two different pages. Hence, by avoiding the cost of performing multiple address translations for each separate mapped load/store uops, this saves address translation bandwidth and reduces power consumption. Also, this maintains the atomicity of the operation, as all accesses to the same virtual page by uops of the single-copy-atomic load/store instruction will receive the same translation and so this avoids having to monitor for updates to the translation tables between one uop and another.

The apparatus may have a load/store buffer to track pending load/store uops. For example the load/store buffer could have entries tracking the addresses and source/destination registers of load/store uops and for tracking whether the load/store uops are still pending or have been completed. In some cases the load/store buffer may be implemented as separate buffers for load and store operations respectively.

In response to the plurality of mapped load/store uops generated in response to the single-copy-atomic load/store instruction, the load/store circuitry may allocate separate buffer entries in the load/store buffer for the mapped load/store uops, and indicate that those separate buffer entries are each associated with the shared memory access request shared between the group of mapped load/store uops as a whole. Hence, although the access request sent to memory can be shared, it is useful to allocate separate buffer entries so that the transfers of data between the loads/store circuitry and the registers can be handled separately for each load/store uop over the narrower load/store data path, but by associating the entries with the same shared memory access request this ensures that a single request can be made to memory to enforce the atomicity of the load/store operation requested by the single-copy-atomic load/store instruction.

One example of a load/store buffer may be a load buffer to track pending load uops. When the single-copy-atomic load/store instruction is a single-copy-atomic load instruction for requesting an atomic load of the target block of data from the memory system to the registers: in response to a plurality of mapped load uops generated by the instruction decoding circuitry, the load/store circuitry allocates separate buffer entries in the load buffer for the plurality of mapped load uops, and indicates that the separate buffer entries for the plurality of mapped load uops are each associated with the shared memory access request; and following receipt of the target block of data from the memory system in response to the shared memory access request, the load/store circuitry uses tracking information in the separate buffer entries allocated for the plurality of mapped load uops to control transfer of the respective portions of the target block of data to the registers. Hence, the separate load buffer entries are linked to a shared memory access request, but once the target block of data has been received from the memory system then the tracking information in the separate buffer entries can be used to manage the separate transfer of the respective portions of the target block of data to the registers.

Another example of the load/store buffer is a store buffer to track pending store uops. When the single-copy-atomic load/store instruction is a single-copy-atomic store instruction for requesting an atomic store of the target block of data from the registers to the memory system: in response to a plurality of mapped store uops generated by the instruction decoding circuitry, the load/store circuitry allocates separate buffer entries in the store buffer for the plurality of mapped store uops, and indicates that the separate buffer entries for the plurality of mapped store micro-operations are each associated with the shared memory access request; and the load/store circuitry defers issuing of the shared memory access request until the respective portions of the target block of data have each been received from the registers corresponding to the plurality of mapped store uops. Hence, it can be useful to allocate separate buffer entries in the store buffer for the mapped store uops to help manage the separate data transfers over the load/store data path. A write buffer may also be provided to buffer the store data received from the registers. A single shared entry of the write buffer may be allocated for use by the plurality of mapped store uops, so that the store data for the respective mapped store uops can be merged into store data for a single shared memory access request. Issuing of the memory access request to transfer that store data to the memory system can be deferred until the respective portions of the target block of data have each been received from the registers corresponding to the mapped store uops, to allow a single shared access request to be issued to transfer the store data to the memory system.

In some implementations, when the single-copy-atomic load/store instruction is a single-copy-atomic-store-with-response instruction for requesting an atomic store of the target block of data from the registers to the memory system and for requesting that a response indication is written to a target register to provide an indication of whether the atomic store was successful or failed: the load/store circuitry allocates a response tracking structure entry for one of a plurality of mapped store uops generated by the instruction decoding circuitry in response to the single-copy-atomic-store-with-response instruction, and skips allocating the response tracking structure entry for remaining mapped store uops of the plurality other than that one of the plurality of mapped store uops; and following receipt of a success/failure indication from the memory system, the load/store circuitry uses information specified in the response tracking structure entry to control writing of the response indication to the target register.

Such a single-copy-atomic-store-with-response instruction can be useful for controlling hardware accelerators or other virtualised devices as it allows the accelerator or device to reject certain requests for an atomic store operation. For example, the accelerator or other device may have a command queue or other control structure to which the target block of data is to be written, but if the command queue or other structure is already full then the hardware accelerator or device may not be able to accept the data and so may return an indication that the atomic store failed. The response indication can be written to a target register of the processing circuitry which requested the atomic-store-with-response operation, so that the software that requested the operation can detect the failure and retry the operation later. Other reasons for possible failure of atomic store could, for example, include detection of an intervening read or write to an address associated with the target block of data being stored part way through updating the locations associated with the target block of data (in some micro-architectural implementations). In some cases the response indication could simply be a pass/fail indication providing a binary indication of whether the store was successful or failed. Other implementations may support a response indication which gives additional information about a reason for the failure, such as providing a multi-bit response code which may have different encodings allocated for indicating different possible reasons. While the particular reason for the atomic store failing can vary depending on the particular micro-architectural implementation and depending on events occurring around the atomic store, supporting a variant of the instruction which requests return of a response indication can be very useful to ensure there is a back pressure mechanism that allows store requests to be rejected, so that it is not necessary for resources at the hardware accelerator or other virtualised device to be provisioned with enough capacity to handle all expected volumes of data transferred in single-copy-atomic store operations.

Where the single-copy-atomic-store-with-response instruction is handled by cracking it into multiple mapped store uops as in the technique discussed above, the handling of the response indication may be managed in common for the group of store uops (rather than each of the individual store uops mapped by the instruction decoding circuitry separately needing to track the response). Hence, the load/store circuitry can allocate a response tracking structure entry for one of the mapped store uops (e.g. the first or last of the mapped store uops) and skip allocating the response tracking structure entry for remaining mapped store uops. This enables more efficient utilisation of the response tracking resources.

Some implementations of the processing circuitry may be in-order implementations which do not support out-of-order execution of uops. In an in-order processor, uops may be restricted to being executed in program order.

However, other implementations may support out-of-order execution of micro-operations in an order different to program order. Hence, the processing circuitry may have some resources for tracking out-of-order execution of uops. Issue circuitry may be provided to control issuing of uops to the processing circuitry for execution.

However, the issue circuitry may prevent out-of-order execution of the mapped load/store uops of one single-copy-atomic load/store instruction relative to mapped load/store uops of another single-copy-atomic load/store instruction. Hence, it may be assumed that the respective single-copy-atomic load/store instructions should be processed in an order consistent with the program order. By avoiding the need to track potentially interleaved mapped load/store uops of multiple single-copy-atomic load/store instructions, the circuit design of the load/store circuitry can be much simpler (e.g. the logic for linking the respective mapped load/store uops together for generating the shared memory access request can be less complex), because after seeing the first mapped load/store uop of one single-copy-atomic load/store instruction, the load/store circuitry can assume that a certain number of subsequent mapped load/store uops will relate to the same single-copy-atomic load/store instruction.

In some examples, there may be an architectural requirement of the single-copy-atomic load/store instruction that the addresses of the target block of data should be mapped to non-cacheable device-type memory regions for which respective accesses to that region should not be reordered. For example, the processing circuitry may signal a fault if there is an attempt to execute the single-copy-atomic load/store instruction specifying an address not mapped to a non-cacheable device type region. Here a "device type" region may be a region of memory defined such that reordering is not permitted and where it is not allowed to merge repeated accesses to the same address (this may be useful for some I/O devices where there may be side effects associated with the memory access so that performing two stores to the same address has a visibly different effect to performing one store to that address which writes the same value as the overall effect of the two stores). Since reordering of respective accesses to non-cacheable device-type regions may be prohibited by the architecture anyway, then out-of-order execution of the plurality of mapped load/store uops of one single-copy-atomic load/store instruction relative to mapped load/store uops of another single-copy-atomic load/store instruction can be prevented. This means that it is not necessary to utilise processing resource for tracking out-of-order execution for the uops of the respective instructions. This can save processing resource and hence improve area and power efficiency.

For the mapped uops relating to a particular single-copy-atomic load/store instruction, the issue circuitry may prevent the first mapped load/store uop of the set being bypassed out-of-order by subsequent mapped load/store uops relating to the same instruction (where the first mapped load/store uop is the one which loads/stores the portion of the target block of data having the lowest address compared to the portions loaded/stored by other mapped load/store uops, and the subsequent mapped load/store uops are those that load/store portions of the target block that have higher addresses than the address of the portion loaded/stored by the first mapped load/store uop). Again, this makes the circuit design of the load/store circuitry simpler compared to implementations which would permit any of the load/store uops in the set to be issued first by the issue circuitry, because the fixed relationship between the address of the first mapped load/store uop seen by the load/store circuitry among the set of mapped load/store uops and the address of the target block as a whole simplifies management of shared functions such as address translation and line fill buffer or write buffer allocation which are performed in response to the first mapped load/store uop and reused for subsequent mapped load/store uops.

However, out-of-order processing of the subsequent mapped load/store uops relative to each other (in an order that differs from the order of the addresses of the corresponding portions of the target block) may still be allowed, which can help to improve performance in cases where there is a register dependency of one of these subsequent mapped load/store uops on an earlier instruction that is still to complete.

Also, for single-copy-atomic loads, when the load data is returned from memory, the load data may come back in any order and the separate transfers of portions of load data to the registers may be processed in any order (including processing the register write for one of the subsequent mapped load uops before the register write for the load data associated with the first mapped load uop in the set).

In some implementations, each mapped load/store uop of the group corresponding to the single-copy-atomic load/store instruction could be a load/store uop which requests transfer of a respective portion of the target block of data between a single register and the memory system.

However, in some implementations the processing circuitry may also support load/store pair uops which can request transfer of data between a specified pair of registers and the memory system. For example, in some instruction set architectures, the load/store pair uops may specify first and second register specifiers for specifying the pair of registers, so that any arbitrary architectural registers may be specified as the pair of registers (with no limitation to specify consecutive architectural register numbers). Alternatively, other architectures could restrict the pair of registers to have consecutive architectural register numbers so that a load/store pair instruction specifying a single architectural register specifier may identify the pair by specifying the architectural register number of the first of the pair of registers, and the architectural register number of the second of the pair of registers may implicitly be defined as the next architectural register number after the specified one (again, register renaming may mean that the physical registers accessed for the load/store pair instruction do not need to have consecutive physical register numbers).

Hence, in some cases, the mapped load/store uops generated for a single-copy-atomic load/store instruction may be load/store pair uops. This can enable the single-copy-atomic load/store instruction to be handled more efficiently than if single-register load/store uops were used. By mapping to load/store pair uops, this halves the number of mapped load/store uops needed to implemented the single-copy-atomic load/store instruction, compared to if single-register load/store uops were used for the mapped load/store uops.

In general, the given size of the target block specified by the single-copy-atomic load/store instruction may be a relatively large size greater than the maximum data size supported by the load/store data path. However, in one example, the given size may be at least 64 bytes. A 64-byte single-copy-atomic load/store instruction can be useful for transferring a relatively large block of data between a hardware accelerator and processing element but may create challenges in efficiently handling that instruction within a pipeline which may have a narrower data path, and so the techniques discussed above can be particularly useful for single-copy-atomic load/store instructions which act on a data block of a size of 64 bytes or more. As an example, the maximum data size supported by the load/store data path could be 16 bytes. For example, this may correspond to the size of the data loaded or stored in response to a load/store pair uop which may read or write two 8-byte registers.

FIG. 1 schematically illustrates an example of a data processing apparatus 2 having at least one processing element (PE) 4 capable of performing processing operations in response to program instructions defined according to a certain instruction set architecture. While FIG. 1 shows a single PE 4 for conciseness, other examples may have multiple PEs. The PE 4 has an instruction decoder 6 for decoding the program instructions to generate micro-operations (uops) which represent the form of the instructions seen by processing circuitry 8. For some types of program instruction, the instruction decoder 6 can decode the instruction into a single uop. Other instructions may have a one-to-many relationship between the instruction and a set of multiple uops processed separately by the processing circuitry 8 corresponding to different parts of the operation represented by the decoded program instruction. It is also possible for the instruction decoder to fuse two or more separate program instructions into a single combined uop to be processed by the processing circuitry 8. A many-to-many mapping of instructions to uops is also possible for some groups of program instructions.

The processing circuitry 8 receives the uops generated by the instruction decoder and, in response to each uop, performs a corresponding processing operation represented by the uop. Registers 10 are provided to store operands for operations performed by the processing circuitry 8, and results of processing operations performed by the processing circuitry 8 can be written back to the registers 10.

Some uops processed by the processing circuitry 8 are load/store memory operations to access data from a memory system. The memory system includes one or more caches 12, which may include one or more private caches private to the PE 4 or a shared cache 13 which may cache data accessible to the PE 4 and also accessible to other sources of memory access requests such as further PEs (not shown in FIG. 1 for conciseness) or a hardware accelerator 22 or I/O device. The memory system also includes memory storage 18. The caches 12, 13 may cache a subset of data from memory 18 for faster access by the PE 4. A memory management unit 14 may be provided in the PE 4 to perform address translation to translate virtual addresses specified by instructions decoded by the instruction decoder 6 into physical addresses identifying memory system locations to be accessed. The MMU 14 may have a translation lookaside buffer (TLB) 16 which caches information from page table structures stored in the memory system, which is used to define the address translation mappings between virtual and physical addresses or to define access permissions controlling which portions of an address space are allowed to be accessed by the PE 4.

An interconnect 20 is provided to handle access to the memory system by the PE 4 and other requesting devices such as the hardware accelerator 22. In some examples, the interconnect 20 may be a coherent interconnect which manages coherency between different caches according to a coherency protocol. In this example, the shared cache 13 is provided at the interconnect 20.

The hardware accelerator 22 is a dedicated piece of hardware designed to perform a specific task more efficiently than would be possible using a set of program instructions executing on the general purpose processing element 4. For example, the hardware accelerator could be designed to accelerate certain tasks such as cryptographic functions, operations used for machine learning processing such as convolutional neural networks (e.g. matrix processing operations), graphics processing, or other specific tasks. The particular function of the hardware accelerator 22 may vary significantly. The hardware accelerator 22 may have some internal control structures such as command queues or workload queues, which can be configured by software executing on the PE 4 by executing a store instruction to store control data to addresses in the memory address space which are mapped to the control structures of the hardware accelerator 22. Similarly, data to be processed by the hardware accelerator 22 can be passed to the hardware accelerator 22 by writing data to addresses mapped to work queue structures of the hardware accelerator 22. By configuring the hardware accelerator 22 with appropriate commands and data, the hardware accelerator can then be controlled to process the data and write its results back to the memory system, from which data can be read back to the PE 4 by performing load operations specifying addresses mapped to the locations used by the hardware accelerator to write the results. The hardware accelerator 22 may be associated with an input/output memory management unit (IOMMU) 24 which performs address translation functions and memory management functions similar to the MMU 14 of the PE 4. Similar to the TLB 16 of the MMU 14, the IOMMU 24 may have a translation lookaside buffer 26 for caching address translation data.

Figure 2:
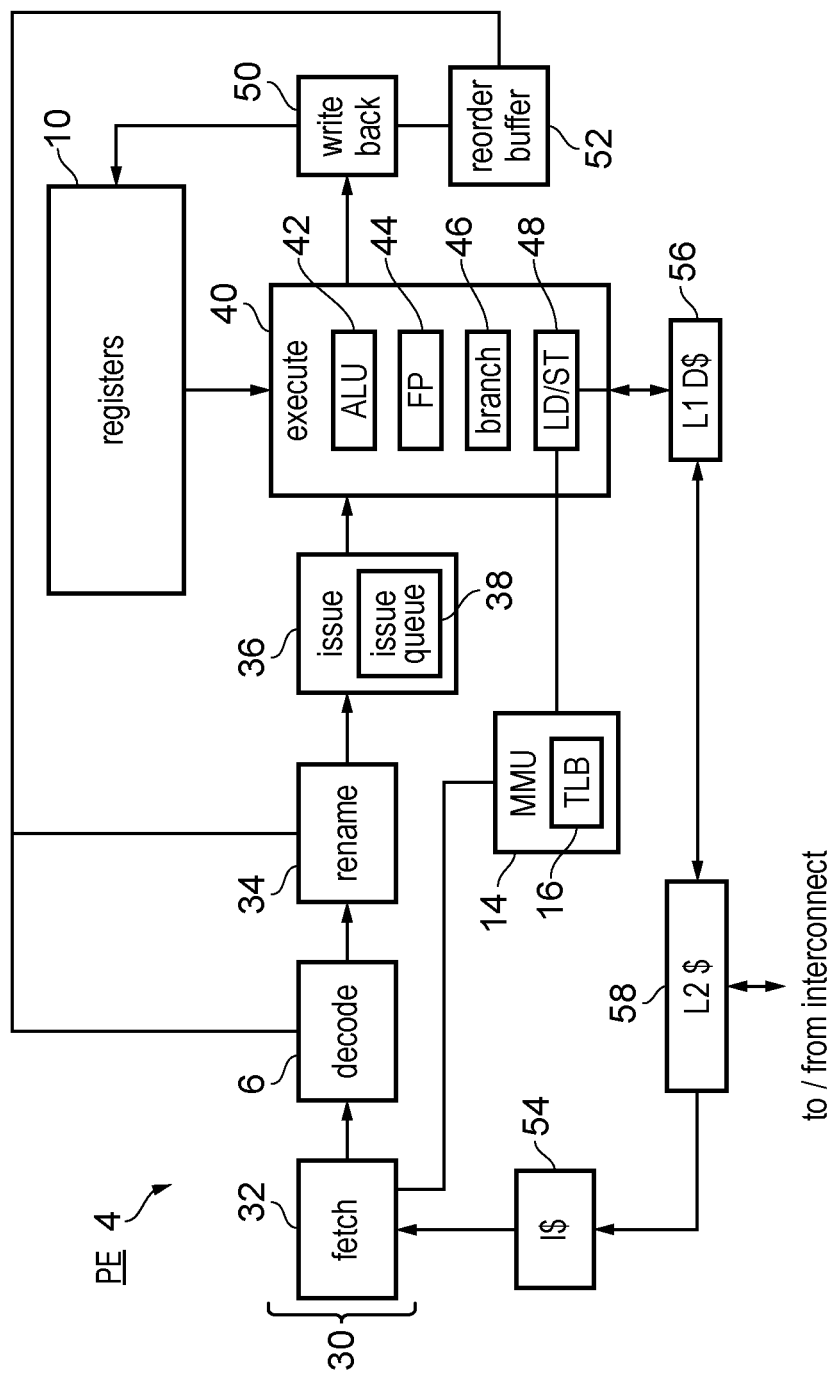
FIG. 2 illustrates in more detail components of a processing element such as a CPU (central processing unit)

FIG. 2 shows in more detail components of the PE 4. The PE 4 has a processing pipeline 30 which has a number of pipeline stages acting in a pipelined manner so that while one instruction is at one stage of the pipeline other stages can be processing other instructions. The pipeline has a fetch stage 32 for fetching program instructions to be processed from an instruction cache 54, shared caches 58, 13 or from memory 18. Fetching of instructions may be controlled based on branch predictions made by a branch predictor (not shown in FIG. 2). Fetched instructions are passed to the instruction decoder 6 which acts as the decode stage of the pipeline 30. The instruction decoder checks the encoding of the instructions to identify a set of micro-operations to be generated and passed to remaining stages of the pipeline. As mentioned above the mapping between instructions and uops can be one-to-one, one-to-many, many-to-one, or many-to-many, depending on which particular instructions are being decoded and on the design choices made by the designer of the particular micro-architectural implementation of the processor.

The decoded instructions are passed to a rename stage 34 which performs register renaming to map architectural register specifiers specified by the decoded instructions to physical register specifiers identifying registers 10 provided in hardware. This helps to support out-of-order execution of instructions, as by providing a larger set of registers 10 in hardware so that different instances of instructions specifying the same architectural register specifier can have their register accesses mapped to different physical addresses, this may eliminate some unnecessary dependencies between instructions giving more opportunities for reordering of execution of micro-operations. In other examples, where the pipeline 30 is an in-order pipeline not supporting out-of-order execution, the rename stage 34 could be omitted.

The decoded instructions pass to an issue stage 36 which queues the decoded uops in an issue queue 38 while awaiting for their operands to become available. Once required operands for a given uop are determined to be available the uop can be issued for execution at an execute stage 40, which executes the operation represented by the uop on one or more operands read from registers 10 to generate a processing result. The execute stage 40 has a number of execution units for executing different classes of uops, such as an arithmetic/logic unit (ALU) 42 for performing arithmetic or logical operations, a floating point unit 44 for performing operations involving floating-point numbers, a branch unit 46 for processing branch operations which may cause a non-sequential change of program flow, and a load/store unit 48 for processing load operations to load data from the memory system to registers 10 or store operations to store data from registers 10 to the memory system. It will be appreciated that other types of execution unit could also be provided and the specific combination of execution units may depend on the choices of the designer of a particular implementation of the processing system.

Results of executed uops are written back to registers 10 by a write back stage 50 of the pipeline. A reorder buffer 52 may be provided in an out-of-order pipeline to track the out-of-order execution of instructions and in-order commitment of instructions once it is known that the out-of-order execution of a given instruction was correct as earlier instructions have resolved. Again, in an in-order pipeline the reorder buffer 52 could be omitted.

In this example, the caches 12 include the instruction cache 54, a level 1 data cache 56 and a shared level 2 cache 58 shared for use by data and instructions. It will be appreciated that other examples could have a different cache hierarchy. The MMU 14 is used by the load/store unit 48 to translate addresses of load/store operations.

Figure 3:
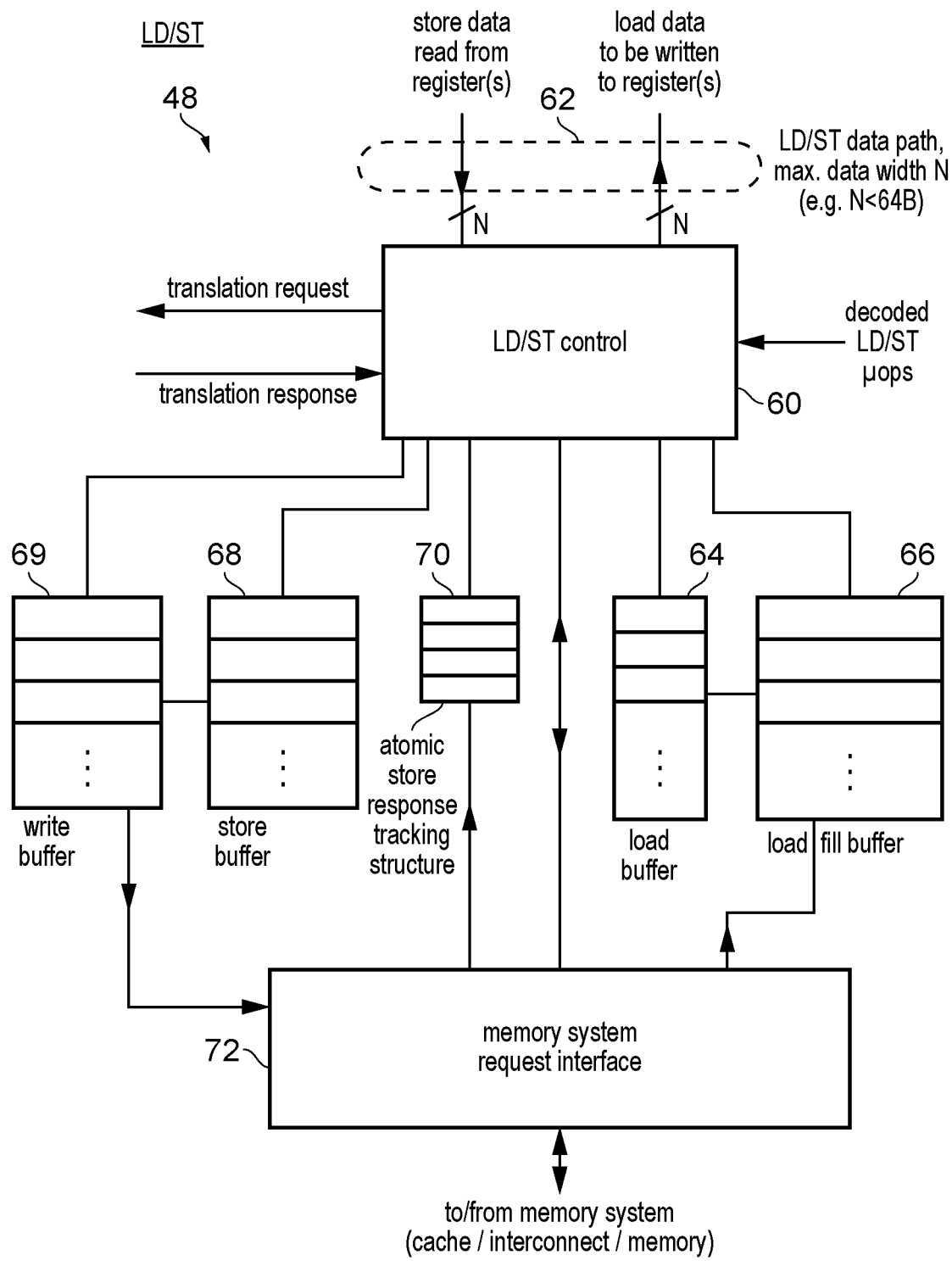
FIG. 3 illustrates in more detail features of a load/store unit of the processing element.

FIG. 3 shows in more detail components of the load/store unit 48 of the processing element 4. The load/store unit 48 includes load/store control circuitry 60 for controlling the processing of load/store operations, a number of tracking structures 64, 66, 68, 69, 70 for tracking the load/store operations that are pending and tracking responses to memory access requests received from the memory system in response to load/store operations, and a memory system request interface 72 for issuing memory access requests to the memory access system and receiving responses from the memory system. These requests may be issued to various parts of the memory system such as the caches 12, interconnect 20 or main memory 18. The interconnect 20 may handle routing memory access requests to the appropriate location, such as the hardware accelerator 22 if a request specifies an address mapped to the hardware accelerator 22.

The load/store unit 48 also has a load/store data path 62 via which load data can be written into the registers 10 or store data can be read from the registers 10. The load/store data path has a certain maximum data width N which defines the maximum data size supported for a single load/store uop by the load/store data path 62. Hence, if data of size greater than N needs to be written to registers or read from the registers then this may require a number of separate transfers. For example, N may correspond to 16 bytes in one implementation, as the instruction set architecture supported by the PE 4 may include support for a load/store pair instruction which loads data to, or stores data from, a pair of 64-bit (8-byte) registers. However, other examples could provide the load/store data path 62 with a different data width other than 16-bytes. Note that the load/store data path 62 refers to the data path used to read or write data from or to the registers 10 during a load/store operation, rather than the data path over which memory access request are sent to the memory system by the load/store unit 48. Although the load/store data path 62 may be limited to the maximum data width N, it is possible the memory system request interface 72 may support transfers of a greater size than N in a single request.

In this example, the tracking structures used by the load/store unit 48 include a load buffer 64, a load fill buffer 66, a store buffer 68, a write buffer 69 and an atomic store response tracking structure 70. However, it will be appreciated that other examples may have a different arrangement of tracking structures and could include some additional tracking structures not shown in FIG. 3.

The load buffer 64 is used to store tracking information about pending load operations. For example, the tracking information could specify the target addresses of pending loads, which could be used for purposes such as hazarding or to determine when store data from a pending load could be forwarded as the load data to be loaded by a pending load. The tracking data in the load buffer 64 for a given load uop could also specify the registers 10 to which loaded data is to be written, so that once the load data is available (e.g. after being returned from a memory system), the load/store control circuitry 60 can trigger the appropriate register write operations to ensure that the load data is written to the correct registers. The load buffer tracking data could also specify an identifier of a memory access request issued to memory for a given load so that it can be identified when the corresponding response to the access request has been received from the memory system.

The load fill buffer 66 may be used to buffer load data received from the memory system while awaiting transfer into the registers 10. This may be useful to deal with the limited bandwidth on the load/store data path 62, so that there is buffer capacity to backup load data received from memory until it can be transferred into registers. Also, it is possible that a given load may trigger a burst request to memory, to request transfer of a burst of data of a given size, but the responses from the memory system may return different portions of the requested burst of data at different times, and so the load fill buffer 66 may be used to assemble the portions of the requested data received for the burst until enough data has been received that it is possible to trigger the register write.

The store buffer 68 is used to store tracking information about pending store operations. For example, the tracking information may specify addresses of store operations which can be checked for hazarding purposes or used to determine when there are multiple store requests to the same address or overlapping blocks of addresses so that it is possible to merge stores into a single store request to memory. Addresses in the store buffer can also be checked against addresses in the load buffer 64 to check whether there is a store to the same address as a subsequent pending load so that the load can be serviced based on the store data forwarded from the store operation without having to issue a request to memory.

The write buffer 69 is used to buffer up the store data to be written to memory while awaiting receipt of the entire block of store data from registers. As will be discussed further below, for single-copy-atomic store instructions the size of the block of data to be stored to memory may be larger than can be transferred over the load/store data path 62 in a single transfer and so the write buffer 69 can be used to monitor when the different portions of data corresponding to the different store uops have been received from registers to determine when it is possible to issue the corresponding store memory access request via the memory system request interface 72.

The atomic store response tracking structure 70 can be used for single-copy-atomic-store-with-response instructions to track a response received from memory indicating whether an atomic store operation has been successful. The tracking information in the atomic store response tracking structure 70 may, for example, specify which destination register should be written with a response indication based on a success/failure indication received from the memory system in response to the atomic store operation. This will be discussed in more detail below with respect to FIGS. 6 and 7.

FIGS. 4-7 show a number of variants of a single-copy-atomic load/store instruction for requesting an atomic transfer of a target of data between the memory system 12, 13, 18 and the registers 10. These instructions request a load or store of a target block of data of a relatively large size (in this example 64 bytes) which is wider than the maximum size N supported by the load/store data path 62.

Figure 4:
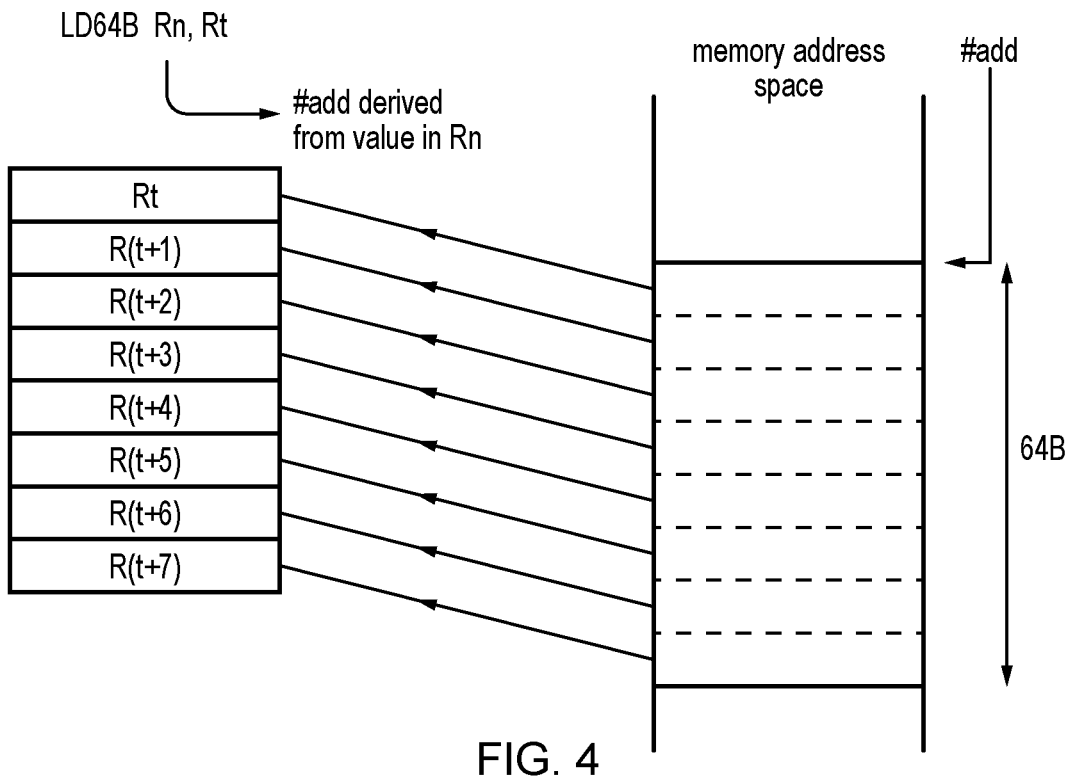
FIGS. 4-7 illustrate several variants of a single-copy-atomic load/store instruction.

FIG. 4 shows a single-copy-atomic load instruction which specifies a first register specifier Rn specifying a register which specifies an address operand used to derive a target address #add identifying the start of the target block of data in the memory address space, and a destination register specifier Rt for identifying a group of registers to act as destination registers for loading with the data of the loaded block of data. In this example, the destination register specifier identifies a first register Rt of the group of registers and a subsequent set of registers with consecutive architectural register numbers are implicitly identified as remaining registers of the group to be loaded with the target block of data. For example, in this example the registers each have a size of 8-bytes (64 bits) and so the 64-byte target block of data is loaded into a group of 8 registers Rt to R(t+7) with each register taking 8 bytes of the target block of data. The ordering of the data is such that the register Rt is loaded with the first 8 bytes of the target block (the first 8 bytes at address #add), the next register with register number R(t+1) is loaded with the next 8 bytes of the target block of data (the 8 bytes at byte address #add+8), and so on up to register R(t+7) being loaded with the final 8 bytes of the target block of data (the 8 bytes at byte address #add+56). It will be appreciated that the register numbers Rt to R(t+7) are the architectural register numbers defined in an instruction set architecture, but the rename stage 34 of the pipeline may map these architectural register numbers to physical register numbers identifying registers 10 in hardware, and the physical register numbers used for the respective registers shown in FIG. 4 may not be consecutive or ordered in the same order as the architectural register numbers Rt to R(t+7), so any arbitrary physical register number could be specified for the respective portions of the transfer, depending on the register mappings selected by the rename stage 34.

The load of the 64-byte target block of data is performed as an atomic operation, so that relative to other load or store operations the load is treated as a non-divisible operation which is performed in its entirety consistent with the view of memory seen at a given point in time. Hence, if there is another store operation which is updating data within all or part of the addresses corresponding to the 64-byte target block of data, the load should be consistent with either that other store having fully been performed before loading the data or not having been performed at all and only updating the data after the load has been performed, but it should not be possible for the atomic load to load data values which correspond to partially performing the other store when other parts of the data updated by that other store have not yet been updated. This does not necessarily mean that other stores to those addresses cannot be performed in the time while the 64-byte block of data is loaded—some microarchitectural implementations of the memory system may allow such intervening accesses, but if such accesses are possible then the memory system may have circuitry which detects the accesses and ensures that the end result is the same as the result that would have been achieved if there had been no intervening accesses in the period between reading the first and last chunks of the 64-byte block of data from the memory system in response to the single-copy-atomic load instruction.

Figure 5:
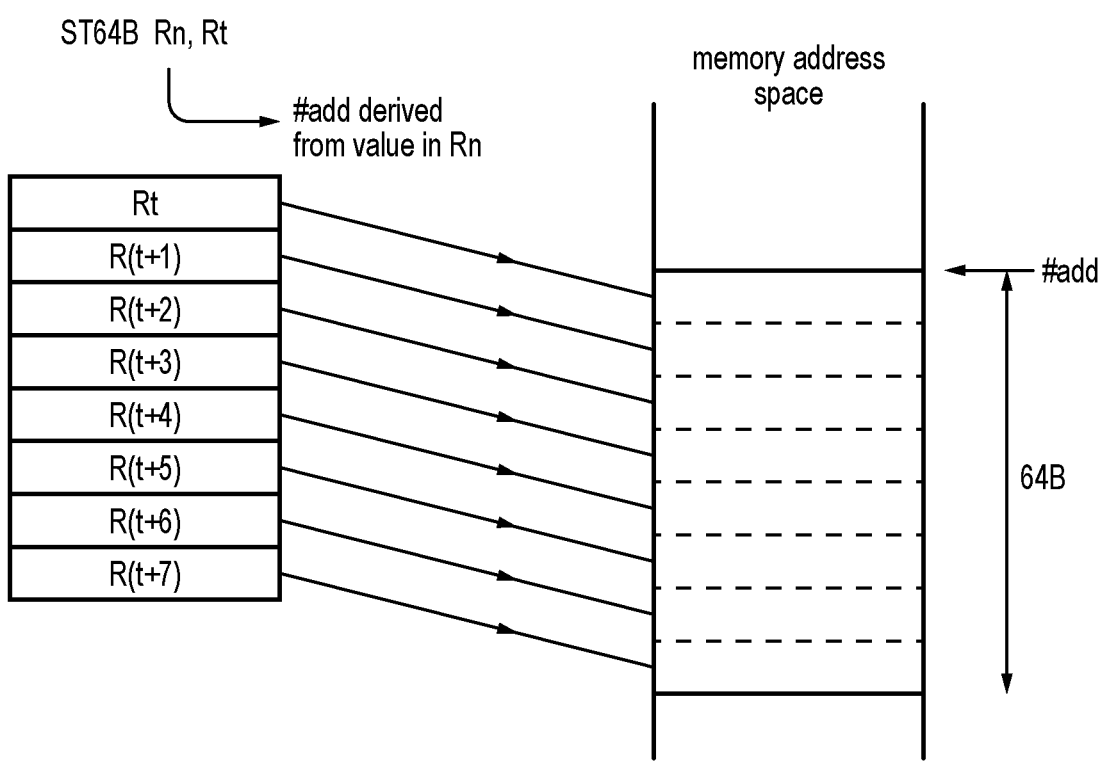

FIG. 5 shows a 64-byte single-copy-atomic store instruction which, similar to the load shown in FIG. 4 specifies a register specifier Rn identifying a register storing an operand for deriving the address of a 64-byte target block of data, and a source register specifier Rt which identifies the first architectural register in a block of 8 consecutive architectural registers Rt to R(t+7) used to provide respective portions of the 64-byte block of data to be stored to the memory system 12, 13,18. Similar to the load, the register having architectural number Rt is used to provide the first 8 bytes of the target block and the register having register number R(t+7) is used to provide the final 8 bytes of the target block. While the load reads data from memory and writes it to the registers, the store reads data from registers and writes it to memory. Again, the store is performed as an atomic operation so that other observers of the addresses corresponding to the target block of data see either the full effects of the store or none of the effects of the store, but are not able to see a partial outcome of performing some parts of the store operation while other parts have not yet been carried out.

Figure 6:
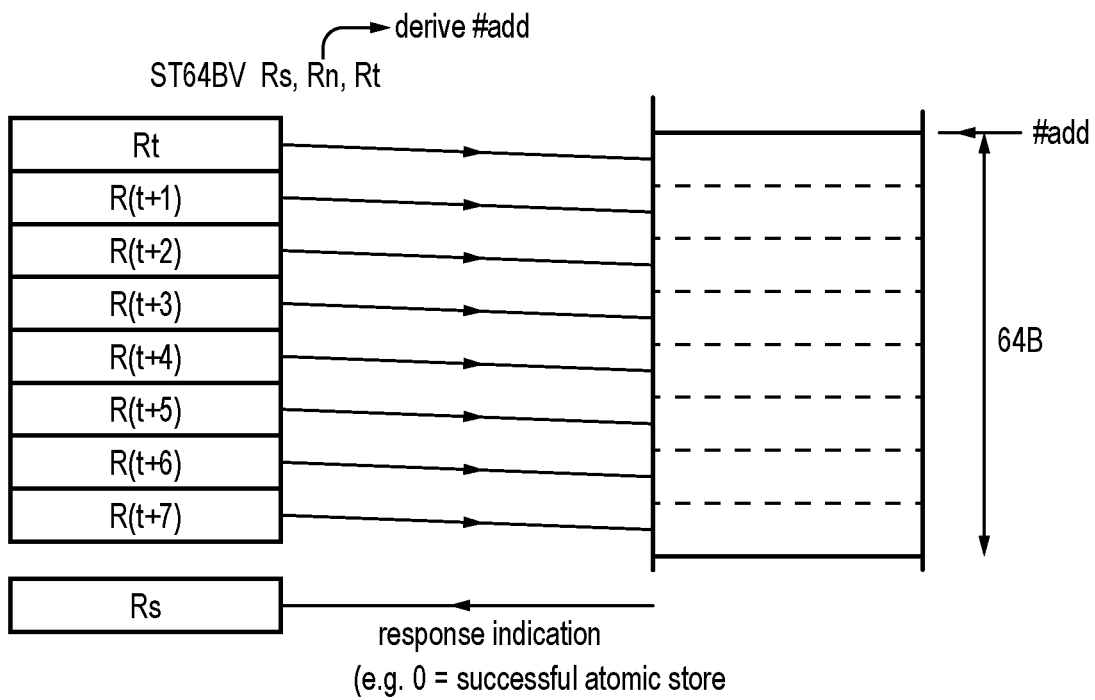

FIG. 6 shows a variant of the single-copy-atomic store instruction, which is a single-copy-atomic-store-with-response instruction, which in addition to the address operand register Rn and the source register Rt also specifies a destination register Rs which is to be written with a response indication indicating whether the atomic store was successful or unsuccessful. The atomic store operation is performed in the same way as shown in FIG. 5. However, with the store-with-response variant of the instruction, the memory system also returns a success/failure indication to indicate whether the atomic store was successful. This enables the component responding to the atomic store to implement a back pressure mechanism where it is possible to reject an attempt to atomically store a block of data to a set of addresses. For example, this could be useful for the hardware accelerator 22 when its internal control structures such as command/work queues are full and so the accelerator 22 does not have capacity to accept more commands or data. The failure mechanism could also be used in memory system implementations where the atomic store is not actually carried out as a single write but may separate the writing of different portions of the target block into different memory write operations, where the memory system may have some tracking logic which tracks intervening accesses to the addresses subject to the store so that if another request is received to read data from, or write data to, an address corresponding to the target block in the period between writing the first part of the target block and writing the last part of the target block, then the failure indication could be returned to indicate that the atomic store was unsuccessful and then the atomic store could be retried again later by the PE 4. The response indication written to the destination register Rs can be helpful for the software executing on the PE 4 to determine how to continue after a failed atomic store. In the example shown in FIG. 6 the response indication is simply a binary flag indicating whether the store was successful or unsuccessful, but it would also be possible to support response indications which may provide more information about the reason for failure in the case where the atomic store was unsuccessful.

Figure 7:
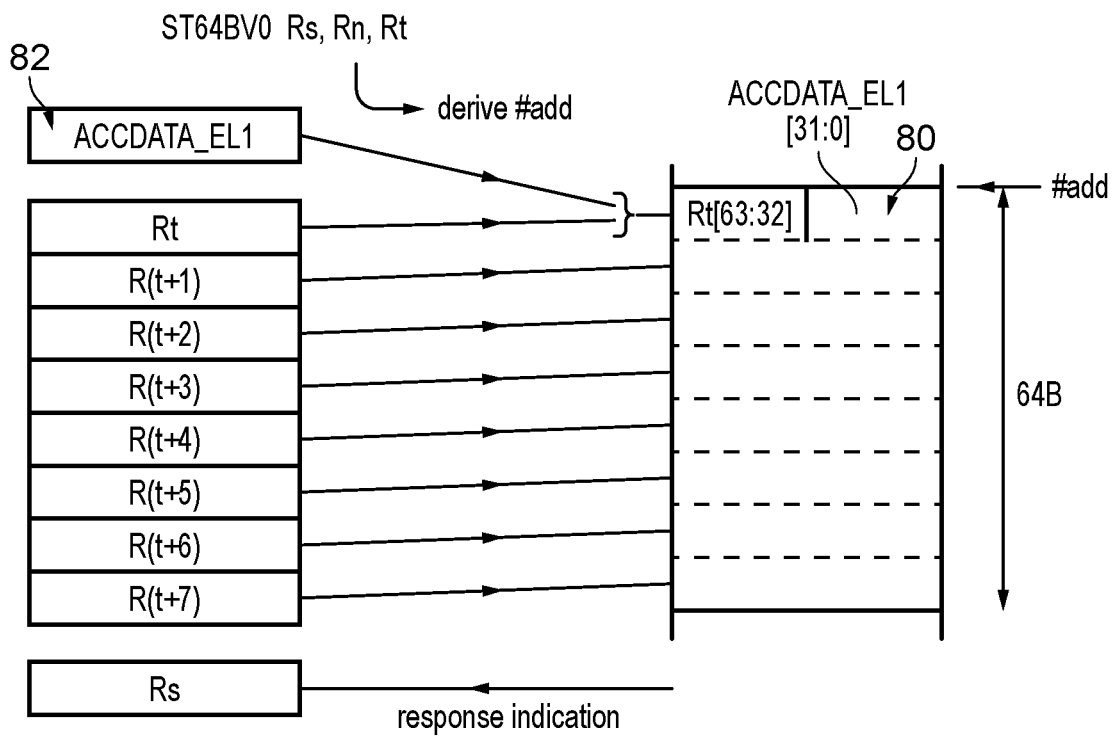

FIG. 7 shows a further variant of the single-copy-atomic-store-with-response instruction, which again supports returning a response indication the same as in FIG. 6, but in the variant shown in FIG. 7 a portion 80 of the target block of data is taken from a system register 82 instead of from the corresponding portion of the first architectural general purpose register Rt. In this example, the portion taken from the system register may be the lower 32 bits (4 bytes) of the target block of data. Hence, for the 8 bytes written to byte address #add, the lower 4 bytes come from the system register ACCDATA_EL1 82 and the upper 4 bytes are read from the most significant 32 bits of the register corresponding to architectural register number Rt. For example, the system register ACCDATA_EL1 82 may be a register which is allowed to be written by software executing at a certain privilege level ED or higher but may not be updatable by software executing at a lowest privilege level EL0. Replacing part of the data to be written to memory with information derived from a system register 82 which can only be written to by higher privilege code can be useful to support virtualisation so that a number of virtualised execution contexts may share access to the hardware accelerator 22 and the information embedded in the target block of data taken from the system register 82 could be an execution context identifier identifying which execution context was sending the target block of data so that the hardware accelerator 22 can distinguish between different threads of processing corresponding to different execution contexts.

In general, the single-copy-atomic load/store instruction of any of the examples shown in FIGS. 4 to 7 can be particularly useful for configuring hardware accelerators 22 as typically the command structures and data structures used by the hardware accelerator 22 may need configuring with a reasonably large amount of data and if these were performed as separate non-atomic operations at a smaller data size then this could risk inconsistency in the commands interpreted hardware accelerator 22. Supporting transfer of a relatively large block of data in a single instruction also helps to reduce the number of instructions needed to be processed by the processing pipeline 30 which can help improve performance.

However, a problem with implementing these instructions is that they may require movement of data between memory and a large number of general purpose registers (e.g. 8 in the examples shown), and the load/store data path 62 of a load/store unit in a typical processor may not be wide enough to handle such a large data transfer in a single transfer. It would be relatively costly to widen this data path 62 to support transfer of the 64-byte block of data in a single transfer, when in practice most instructions will not use that wider data path. The processing pipeline may already support load pair instructions which can load or store data to or from a pair of architectural registers, so that the load/store data path may have a width N of 16 bytes (two 64-bit register widths).

Hence, natively supported load pair or store pair (LDP/STP) uops can be used to implement 64-byte aligned single-copy-atomic load/store instructions with reduced hardware cost. We crack these instructions at the decode stage 6 to generate four LDP/STP uops, each accessing 16 bytes of memory. The decoder 6 adjusts the address of these individual LDP/STP uops to read consecutive 16-byte chunks within the 64-byte aligned block. The 64-byte block is required by the architecture to be 64-bytes aligned, and so an attempt to execute the single-copy-atomic load/store instruction specifying a misaligned address (not aligned to a 64-byte address boundary) causes a fault. Since these individual loads and stores access data in the same page, we allow the first of the LDP/STP uops to translate, and skip the translation process for the remaining three. The architecture restricts these instructions to non-cacheable/device memory which would already be serialized by the CPU, so there is no need to expend out-of-order tracking resource on allowing out-of-order handling of the mapped LDP/STP uops of one single-copy-atomic load/store instruction relative to the mapped LDP/STP uops of another single-copy-atomic load/store instruction. The issue circuitry 36 may restrict the order in which the LDP/STP uops of a set corresponding to a given single-copy-atomic load/store instruction are issued, so that the first LDP/STP uop in the set (which targets the least significant portion of the target block of data) is required to be issued before all remaining LDP/STP uops in the set, but reordering of the remaining LDP/STP uops relative to each other is permitted provided they all are issued after the first LDP/STP uop. This makes it simpler to perform a shared translation triggered by the first LDP/STP uop and to link the 4 individual LDP/STP uops to allow for atomic access. The first LDP in the sequence that translated successfully allocates a load fill buffer entry and the remaining ones link to it. Once all 4 LDPs have linked, a 64-byte read request is made to memory to bring in the data and when data is back, the individual LDP uops read 16-byte chunks. Similarly the first STP uop allocates a write buffer entry and the remaining ones merge to it. Once all 4 16-byte chunks have written to the write buffer 69, a 64-byte write request is made to memory.

While the preceding paragraph describes cracking the 64-byte single-copy-atomic load/store instructions into load pair instructions, other implementations which do not support load/store pair instructions could crack the single-copy-atomic load/store instructions into single-register load/store operations which load or store data to or from a single architectural single register. In that case, there may be 8 separate mapped load/store uops generated in response to the single-copy-atomic load/store instruction, each for transferring a 8-byte chunk of the target block of data.

Figure 8:
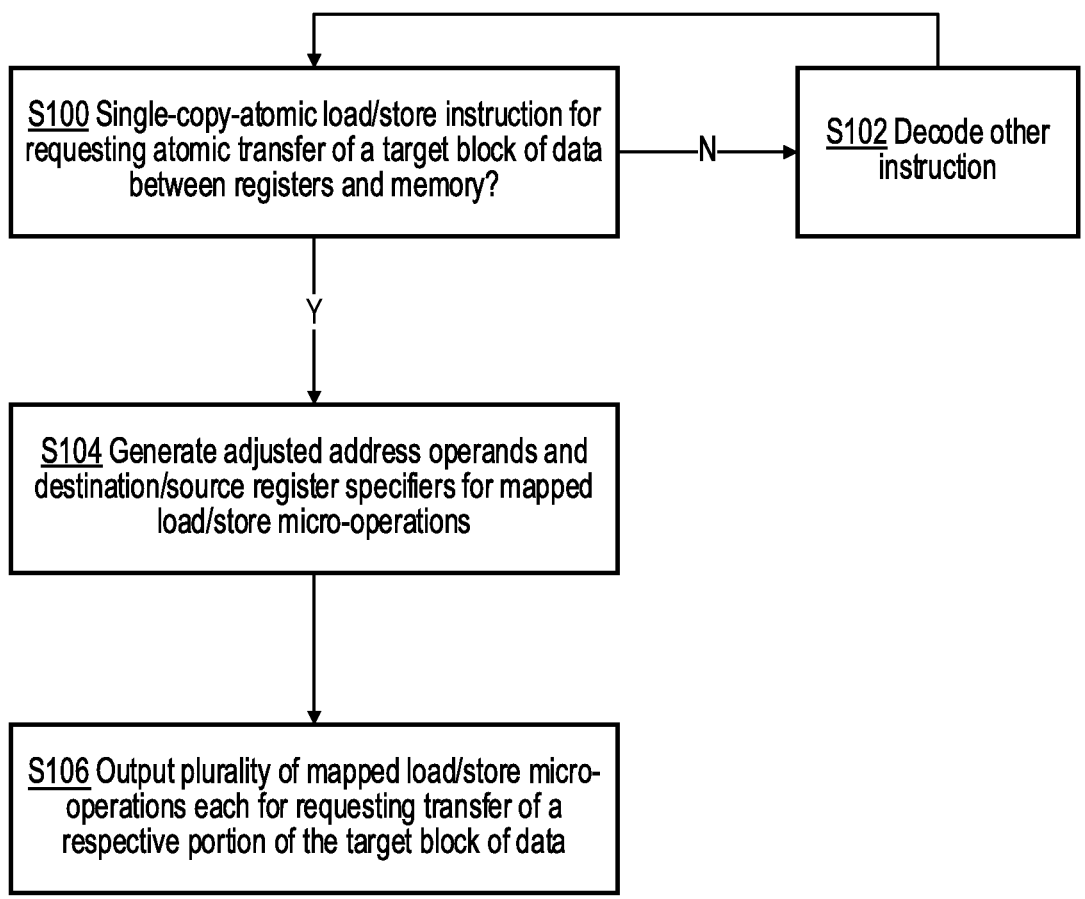
FIG. 8 is a flow diagram showing a method for controlling decoding of a single-copy-atomic load/store instruction to output a plurality of mapped load/store micro-operations.

FIG. 8 illustrates a method of handling single-copy-atomic load/store instructions at the instruction decoder 6. At step S100 the instruction decoder 6 decodes the next program instruction to be processed and checks what type of instruction has been encountered. It is determined whether the instruction is a single-copy-atomic load/store instruction which requests an atomic transfer of a target block of data between registers and memory, where the target block of data is of a size greater than the maximum data size N supported by the load/store data path 62. If not, at step S102 the instruction decoder decodes the other type of instruction that has been encountered and generates a set of one or more uops according to the particular type of instruction decoded.

If at step S100 the single-copy-atomic load/store instruction is encountered then at step S104 the instruction decoder uses the address operand of the single-copy-atomic load/store instruction to generate adjusted address operands for a number of mapped load/store uops generated corresponding to the single-copy-atomic load/store instruction. The first load/store uop can be generated with an address operand that is the same as the address operand specified for the single-copy-atomic load/store instruction, but subsequent uops are generated so that an offset between the addresses indicated by the adjusted address operands for two successive mapped load/store uops corresponds to the maximum data size supported for a single load/store uop by the load/store data path 62. The particular way in which the address operands are represented in the mapped load/store uops may depend on the addressing mode used for the single-copy-atomic load/store instruction. For example, if the addresses are specified as an offset relative to a base address, the instruction decoder could adjust the offsets specified for the individual mapped load/store uops so that the offsets are separated by intervals corresponding to the maximum data size N for the load/store data path 62.

Also, at step S104 the instruction decoder generates adjusted destination/source register specifiers for the mapped load/store uops. These adjusted destination/source register specifiers indicate that the mapped load/store uops are to request transfer of data to or from different destination/source registers. If the operation is a store then the registers are source registers and if the operation is a load then the registers are destination registers. For example, if the single-copy-atomic load/store is being mapped to the load/store pair uops then each successive mapped load/store uop could have one or more destination/source register specifiers specifying architectural register numbers which are two greater than the architectural register numbers specified by the corresponding one or more destination/source register specifiers specified for the previous mapped load/store uops. The first load/store uop of the set may specify, for a first destination/source register specifier, the same architectural register number as was specified in the original single-copy-atomic load/store instruction. If the ISA supported by the processing circuitry 8 and instruction decoder 6 defines load/store pair instructions as specifying two independent register specifiers, rather than implicitly defining the second register of the pair in relation to the first register, then for the first load/store uop of the set, for the first load/store uop of the set, the instruction decoder 6 also generates an adjusted second destination/source register specifier specifying an architectural register number 1 greater than the architectural register number specified by the first destination/source register specifier. It will be appreciated that the register numbers mentioned in this paragraph are architectural register numbers and may still be subject to register renaming at the rename stage 34 to map them to different physical register numbers.

Having generated the adjusted address operands and register specifiers, at step S106 the instruction decoder 6 outputs the set of mapped load/store uops each for requesting a transfer of a respective portion of the target block of data. These mapped load/store uop are provided to remaining stages of the pipeline to be subject to register renaming, issue and execution. Hence, by cracking the single-copy-atomic load/store instruction into a number of mapped load/store uops each corresponding to a smaller data size this avoids the need to expand the width of the load/store data path 62.

Figure 9:
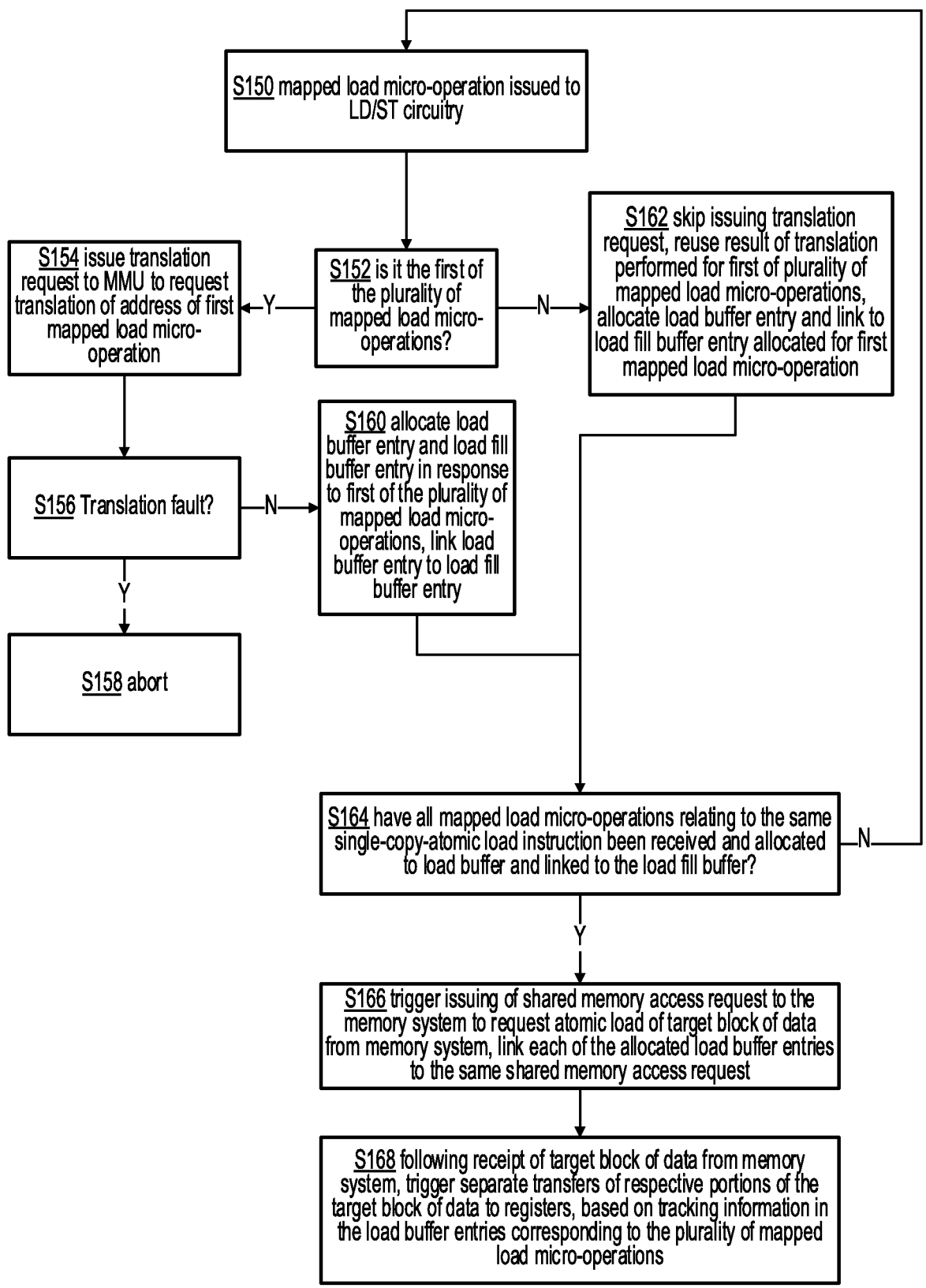
FIG. 9 is a flow diagram showing processing of a mapped load-micro-operation generated by the instruction decoder in response to a single-copy-atomic load instruction.
Figure 10:
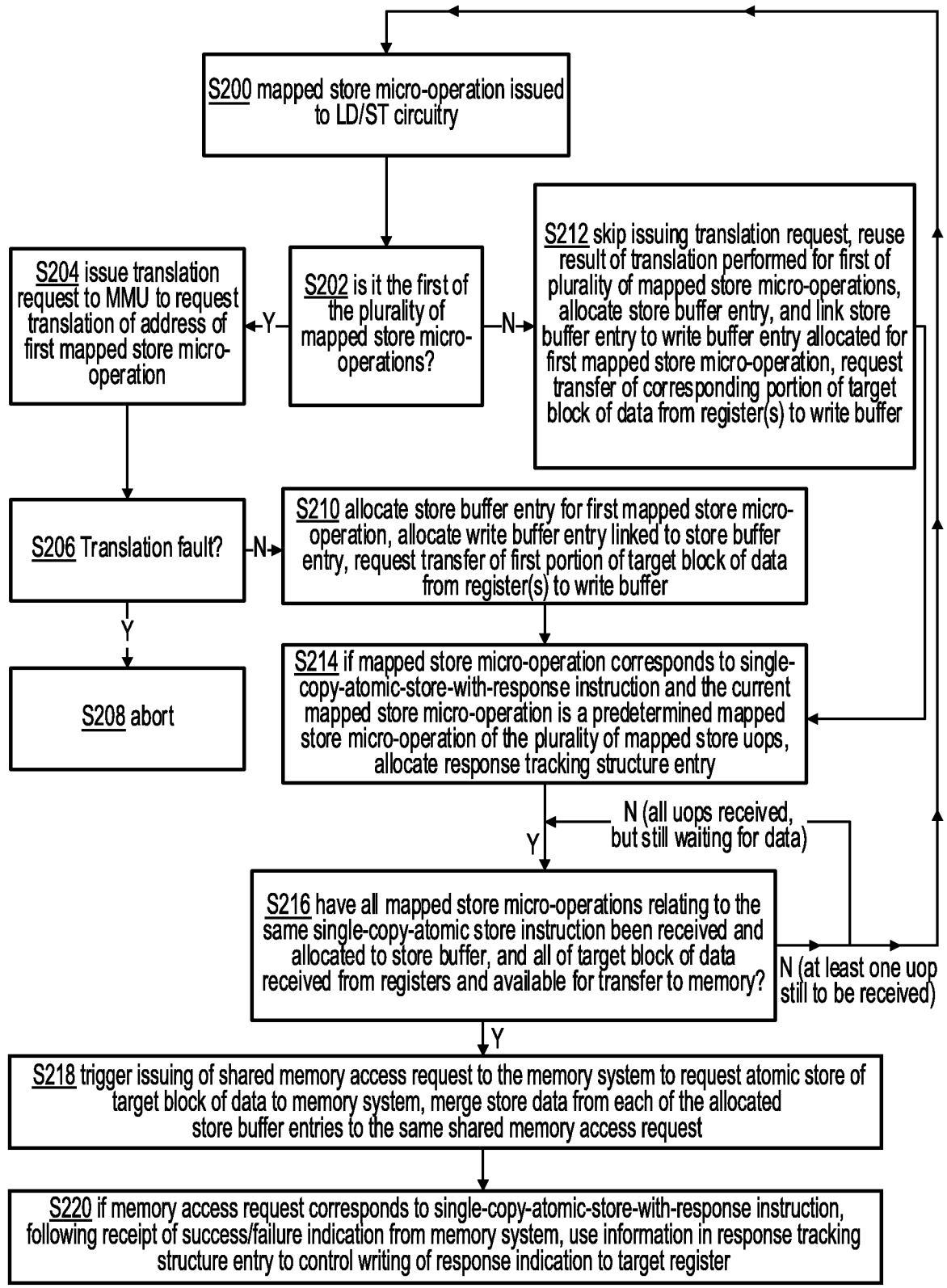
FIG. 10 is a flow diagram showing a method of processing a mapped store micro-operation generated by the instruction decoder in response to a single-copy-atomic store instruction.

FIGS. 9 and 10 below show steps performed when handling mapped load uops and mapped store uops respectively. In both cases, there are some steps which are performed differently depending on whether the mapped load/store uop currently being handled is the first in the set of mapped load/store uops corresponding to a single-copy-atomic load/store instruction, or is a second or subsequent mapped load/store uop. For both loads and stores, the load/store unit 48 can identify whether the mapped load/store uop corresponds to a single-copy-atomic load/store instruction in a variety of ways. For example, at the decode stage when the single-copy-atomic load/store instruction is cracked into separate map load/store uops, the mapped load/store uops could be tagged with an indicator which distinguishes them from load/store uops which were not decoded from a single-copy-atomic load/store instruction, so that, for example, a mapped load/store pair uop corresponding to a single-copy-atomic load/store instruction can be distinguished from a load/store pair uop decoded from a load/store pair instruction. The tag could also identify whether this is the first of the load/store uops or a subsequent uop. Alternatively, whether the load/store uop is the first load/store uop of the set or a subsequent uop could be determined implicitly from other information. For example, an instruction identifier corresponding to the single-copy-atomic load/store instruction could be assigned to each mapped load/store uop and then the load/store unit 48 may be able to count how many load/store uops have been seen corresponding to a given instruction identifier to determine whether the load/store uop is the first in the set and to determine how many are still remaining. Hence, it will be appreciated that a variety of techniques could be used to identify whether the load/store uop is the first of the load uops corresponding to a given single-copy-atomic load/store instruction.

FIG. 9 is a flow diagram showing steps performed by the load/store unit 48 when one of the mapped load micro-operations is issued to the load/store circuitry 48 following decoding of a single-copy-atomic load instruction as shown in FIG. 8.

At step S150 the load/store unit 48 receives the mapped load uop. At step S152 the load/store control circuitry 60 determines whether this is the first of the group of the mapped load uops corresponding to a given single-copy-atomic load instruction.

If the received mapped load uop is the first in the set, then at step S154 the load/store circuitry 48 issues a translation request to the MMU 14 to request translation of the address specified by the first mapped load uop. The MMU 14 translates the address and checks any access permissions associated with the address. At step S156 the MMU 14 determines whether a translation fault needs to be generated, e.g. because no address translation mapping may have been defined corresponding to the address of the first mapped uop or because the access request violated access permissions defined for the corresponding address. If a translation fault arises, at S158 the access is aborted. The fault may trigger an exception which may cause an exception handler to execute and this may cause prevent remaining load uops for the single-copy-atomic load instruction being processed. If there was no translation fault then the translated physical address is returned by the MMU 14 to the load/store control circuitry 60, then at step S160 a load buffer entry is allocated in load buffer 64 for the first mapped load uop, and also a load fill buffer entry (linked to the allocated load buffer entry) is allocated in the load fill buffer 66 for controlling issuing of the shared read request and capturing the load data returned from memory for the plurality of mapped load uops (this load fill buffer entry will be reused by the subsequent mapped load uops).

On the other hand, if at step S152 it was determined that the current mapped load uop was not the first in the set of mapped load uops generated for the single-copy-atomic load instruction, then at step S162 the issuing of the translation request can be skipped as the second or further mapped load uop can reuse the result of the translation performed for the first mapped load uop previously encountered. Hence, for the second or further mapped load uops, steps S154 to S158 can be skipped. At step S162, a load buffer entry is allocated in load buffer 64 for the current mapped load uop, which is linked to the load fill buffer entry which was allocated for the first mapped load uop at step S160. Hence, each mapped load uop may be given a separate load buffer entry 64 so that its tracking data can be recorded. For example, this may track the fact that each individual load uop will need to have its load data written to separate registers in a separate data transfer over the load/store data path 62. However, the mapped load uops each link to the same load fill buffer entry. For example, each of the load buffer entries allocated for the respective mapped load uops corresponding to the single-copy-atomic load/store instruction could specify an identifier of the shared entry of the load fill buffer 66.

At step S164, the load/store control circuitry 60 (e.g. based on a signal from circuit logic associated with the load fill buffer 66) determines whether all mapped load uops relating to the same single-copy-atomic load/store instruction have been received and have allocated an entry in the load buffer 64 and linked to the shared entry in the load fill buffer 66. For example, the load fill buffer entry may include some state information for tracking whether each mapped load uop has linked to it, which can be used to determine whether there are any mapped load uops still remaining to be processed from the set of mapped load uops corresponding to a given single-copy-atomic load instruction. If there is still another mapped load uop to be received, then the method returns to step S150 to await further load uops corresponding to that instruction.

Once all the mapped load uops relating to a given single-copy-atomic load instruction have been received, then at step S166 the load/store control circuitry triggers issuing of a shared memory access request to the memory system via the memory system request interface 72, to request an atomic load of the target block of data from the memory system. Each of the allocated load buffer entries in load buffer 64 is linked to the same shared memory access request. As a single shared request is issued corresponding to the group of mapped load uops, this makes it easier for the memory system to manage handling the load as an atomic operation. For example the shared memory access request could be a burst request which requests access to a burst of data of size 64 bytes corresponding to the size of the target block. The load/store unit 48 awaits return of the target block of data from the memory system. It is not essential for the target block of data to be returned from the memory system in a single transfer and in some cases different portions of the target block of data may be received at different times (although as mentioned above the memory system may have mechanisms for checking whether the operation has the same result as if it was performed atomically in a single copy).

At step S168, following receipt of the target block of data from memory system, when all of the target data is available the load/store control circuitry 60 triggers a number of separate transfers of respective portions of the target block of data to the registers 10, based on the tracking information in the load buffer entries in load buffer 64 that were allocated corresponding to the mapped load uops. For example, this tracking information may specify which registers are to be written with which portions of the target block of data. The data that has been accumulated in load fill buffer 66 is read out and transferred into the respective registers specified. Hence, although the memory access request was issued as a shared request, the transfers over the load/store data path 62 are separate, to enable use of a narrower data path.

FIG. 10 is a flow diagram showing similar operations for a mapped store uop issued to the load/store unit 48 in cases where the single-copy-atomic instruction was a store instruction. At step S200 a mapped store uop is issued to the load/store unit 48 and again at step S202 the load/store control circuitry 60 determines whether the mapped store uop is the first of the set of mapped store uops corresponding to a given single-copy-atomic store instruction. Again, if the mapped store uop is the first of the set of mapped store uops then at step S204 a translation request is issued to the MMU to request translation of the address of the first mapped store uop and if there is a translation fault identified at step S206 then at S208 an abort is triggered and processing halts. If there is no translation fault then the translated physical address is returned to the load/store control circuitry 60. Also, at step S210, when the received mapped store uop is the first of the set of map store uops corresponding to a given single-copy-atomic store, a store buffer entry is allocated in store buffer 68 for the mapped store uop, and also a write buffer entry is allocated in write buffer 69 for accepting the store data read from registers for the plurality of mapped store uops. The store buffer entry allocated for the first mapped store uop is linked to the newly allocated write buffer entry (e.g. by specifying an identifier of that write buffer entry). The load/store control circuitry 60 requests the transfer of the first portion of the target block of data from registers 10 to the write buffer 69.

On the other hand, if at step S202 it was identified that the currently processed store uop was not the first in the set of mapped store uop generated for a given atomic store operation, then at step S212 the issuing of the translation request is skipped and the result of the translation performed for the first mapped store uop can be reused. Hence, steps S204, S206, S208 and S210 can be skipped for the second or further store uop. At step S212, a store buffer entry is allocated in store buffer 68 for the current mapped store uop, so the store buffer entry is allocated with separate entries for each mapped store uop of the plurality of mapped store uops. However, no additional allocation is made in the write buffer 69 for the current mapped store uop, and instead the store buffer entry allocated at S212 is linked to the write buffer entry allocated for the first mapped store uop at step S210. At step S212 the load/store control circuitry 60 also requests the transfer of a corresponding portion of the target block of data from registers 10 to the write buffer 69. Each respective mapped store uop may request data from a different set of one or more registers (e.g. two registers in the case where store pair uops are used). The load/store control circuitry 60 awaits return of the data from the registers.

At step S214, if the mapped store uop corresponds to a single-copy-atomic-store-with-response instruction, and the current mapped store uop is a predetermined mapped store uop of the set, then the load/store control circuitry 60 allocates an entry in the atomic store response tracking structure 70 for handling the return of the response indication indicating whether the atomic store was successful or unsuccessful. For example, the predetermined mapped store uop could be the first mapped store uop of the set, or the last mapped store uop of the set. Hence, the allocation into the atomic store response tracking structure 70 is performed for one of the plurality of mapped store uops corresponding to a given single-copy-atomic-store-with-response instruction and is not performed for the other mapped store uops corresponding to the given single-copy-atomic-store-with-response instruction.

At step S216, the load/store control circuitry 60 checks whether all the mapped store uops relating to the same single-copy-atomic-store instruction have been received and have allocated entries in the store buffer 68, and also checks whether all of the target block of data has been received from registers and is available in write buffer 69 for transfer to memory. If further store uops are still to be received then the method returns to step S200 to process remaining store uops. If all mapped store uops have already been received but the return of the store data from the registers is still being awaited then the load/store control circuitry 60 continues to wait at step S216.

Once all the mapped store uops have been received and all of the target block of data has been received from registers 10, at step S218 the load/store control circuitry 60 triggers the issuing of a shared memory access request to the memory system to request an atomic store of the target block of data to the memory. The single write buffer entry allocated at step S210 merges the store data received from the registers for each of the set of merged store uops, so that a single shared memory access request can be issued to the memory system to request the atomic store operation. This makes handling of the atomic operation in the memory system much simpler to manage. If the instruction was not an instruction requiring the response indication to be returned then the method may halt after step S218.

However, if the memory access request corresponds to a single-copy-atomic-store-with-response instruction, such as the examples in FIGS. 6 and 7, then at step S220 following receipt of a success/failure indication received from the memory system to indicate whether the atomic store was successful, the load/store control circuitry 60 uses information in the entry allocated to the atomic store response tracking structure 70 at step S214 to control writing of a response indication to the target register Rs that was specified by the instruction.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may be define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may embody computer-readable representations of one or more netlists. The one or more netlists may be generated by applying one or more logic synthesis processes to an RTL representation. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
   instruction decoding circuitry to decode instructions to generate micro-operations; and
   processing circuitry to perform data processing operations in response to the micro-operations; in which:
   the processing circuitry comprises load/store circuitry to process load/store micro-operations for transferring data between registers and a memory system, the load/store circuitry having a load/store data path to receive store data read from at least one register in response to a store micro-operation or to output load data to be written to at least one register in response to a load micro-operation;
   in response to a single-copy-atomic load/store instruction for requesting an atomic transfer of a target block of data between the memory system and the registers, where the target block of data has a given size greater than a maximum data size supported for a single load/store micro-operation by the load/store data path, the instruction decoding circuitry is configured to map the single-copy-atomic load/store instruction to a plurality of mapped load/store micro-operations each for requesting transfer of a respective portion of the target block of data; and
   in response to the plurality of mapped load/store micro-operations mapped from the single-copy-atomic load/store instruction by the instruction decoding circuitry, the load/store circuitry is configured to:
      trigger issuing of a shared memory access request to the memory system to request the atomic transfer of the target block of data of said given size to or from the memory system, where the shared memory access request is shared between the plurality of mapped load/store micro-operations; and
      trigger separate transfers of respective portions of the target block of data over the load/store data path in response to the plurality of mapped load/store micro-operations; and
   when the single-copy-atomic load/store instruction is a single-copy-atomic-store-with-response instruction for requesting an atomic store of the target block of data from the registers to the memory system and for requesting that a response indication be written to a target register to provide an indication of whether the atomic store was successful or failed:
      the load/store circuitry is configured to allocate a response tracking structure entry for one of a plurality of mapped store micro-operations generated by the instruction decoding circuitry in response to the single-copy-atomic-store-with-response instruction, and to skip allocating the response tracking structure entry for remaining mapped store micro-operations of the plurality of mapped store micro-operations other than said one of the plurality of mapped store micro-operations; and
      following receipt of a success/failure indication from the memory system, the load/store circuitry is configured to use information specified in the response tracking structure entry to control writing of the response indication to the target register.

2. The apparatus according to claim 1, in which the single-copy-atomic load/store instruction specifies an address operand for calculating an address of the target block of data; and
   the instruction decoding circuitry is configured to generate adjusted address operands, derived from the address operand of the single-copy-atomic load/store instruction, to indicate that the mapped load/store micro-operations are to request transfer of respective portions of the target block of data.

3. The apparatus according to claim 2, in which an offset between addresses indicated by the adjusted address operands for two successive mapped load/store micro-operations of said plurality of mapped load/store micro-operations corresponds to said maximum data size supported for a single load/store micro-operation.

4. The apparatus according to claim 1, in which the single-copy-atomic load/store instruction specifies a destination/source register specifier, and indicates that the target block of data is to be transferred to or from a plurality of registers with register specifiers derived from the destination/source register specifier; and
   the instruction decoding circuitry is configured to generate adjusted destination/source register specifiers, derived from the destination/source register specifier of the single-copy-atomic load/store instruction, for the mapped load/store micro-operations, to indicate that the mapped load/store micro-operations are to request transfer of respective portions of the target block of data to or from different destination/source registers.

5. The apparatus according to claim 1, comprising address translation circuitry to perform address translation; in which:
   in response to the plurality of mapped load/store micro-operations, the load/store circuitry is configured to request that the address translation circuitry perform an address translation for one of the plurality of mapped load/store micro-operations, and to skip requesting address translations for remaining mapped load/store micro-operations of the plurality of mapped load/store micro-operations other than said one of the plurality of mapped load/store micro-operations.

6. The apparatus according to claim 1, comprising a load/store buffer to track pending load/store micro-operations; in which:
   in response to the plurality of mapped load/store micro-operations, the load/store circuitry is configured to allocate separate buffer entries in the load/store buffer for the plurality of mapped load/store micro-operations, and to indicate that said separate buffer entries for the plurality of mapped load/store micro-operations are each associated with the shared memory access request.

7. The apparatus according to claim 1, comprising a load buffer to track pending load micro-operations; in which:
   when the single-copy-atomic load/store instruction is a single-copy-atomic load instruction for requesting an atomic load of the target block of data from the memory system to the registers:
      in response to a plurality of mapped load micro-operations generated by the instruction decoding circuitry, the load/store circuitry is configured to allocate separate buffer entries in the load buffer for the plurality of mapped load micro-operations, and to indicate that said separate buffer entries for the plurality of mapped load micro-operations are each associated with the shared memory access request; and following receipt of the target block of data from the memory system in response to the shared memory access request, the load/store circuitry is configured to use tracking information in the separate buffer entries allocated for the plurality of mapped load micro-operations to control transfer of the respective portions of the target block of data to the registers.

8. The apparatus according to claim 1, comprising a store buffer to track pending store micro-operations; in which:

when the single-copy-atomic load/store instruction is a single-copy-atomic store instruction for requesting an atomic store of the target block of data from the registers to the memory system:

in response to at least two mapped store micro-operations generated by the instruction decoding circuitry in response to the single-copy-atomic store instruction, the load/store circuitry is configured to allocate separate buffer entries in the store buffer for the at least two mapped store micro-operations, and to indicate that said separate buffer entries for the at least two mapped store micro-operations are each associated with the shared memory access request; and the load/store circuitry is configured to defer issuing of the shared memory access request until the respective portions of the target block of data have each been received from the registers corresponding to the at least two mapped store micro-operations.

9. The apparatus according to claim 1, in which the processing circuitry is configured to support out-of-order execution of micro-operations, and the apparatus comprises issue circuitry to issue micro-operations to the processing circuitry for execution; and the issue circuitry is configured to prevent out-of-order execution of the plurality of mapped load/store micro-operations of one single-copy-atomic load/store instruction relative to mapped load/store micro-operations of another single-copy-atomic load/store instruction.

10. The apparatus according to claim 1, in which the processing circuitry is configured to support out-of-order execution of micro-operations, and the apparatus comprises issue circuitry to issue micro-operations to the processing circuitry for execution; and for the plurality of mapped load/store micro-operations mapped from the single-copy-atomic load/store instruction, the issue circuitry is configured to prevent a first mapped load/store micro-operation of the plurality of load/store micro-operations from being bypassed by a subsequent mapped load/store micro-operation of the plurality of load/store micro-operations.

11. The apparatus according to claim 1, in which the plurality of mapped load/store micro-operations are load/store pair micro-operations each to request transfer of a respective portion of the target block of data between a pair of registers and the memory system.

12. The apparatus according to claim 1, in which the given size is at least 64 bytes.

13. The apparatus according to claim 1, in which the maximum data size is 16 bytes.

14. A method comprising:

decoding instructions to generate micro-operations; and performing data processing operations in response to the micro-operations, using processing circuitry comprising load/store circuitry to process load/store micro-operations for transferring data between registers and a memory system, the load/store circuitry having a load/store data path to receive store data read from at least one register in response to a store micro-operation or to output load data to be written to at least one register in response to a load micro-operation; in which:

in response to a single-copy-atomic load/store instruction for requesting an atomic transfer of a target block of data between the memory system and the registers, where the target block of data has a given size greater than a maximum data size supported for a single load/store micro-operation by the load/store data path, the single-copy-atomic load/store instruction is mapped to a plurality of mapped load/store micro-operations each for requesting transfer of a respective portion of the target block of data; and in response to the plurality of mapped load/store micro-operations mapped from the single-copy-atomic load/store instruction:

triggering issuing of a shared memory access request to the memory system to request the atomic transfer of the target block of data of said given size to or from the memory system, where the shared memory access request is shared between the plurality of mapped load/store micro-operations; and triggering separate transfers of respective portions of the target block of data over the load/store data path in response to the plurality of mapped load/store micro-operations; and in response to the single-copy-atomic load/store instruction being a single-copy-atomic-store-with-response instruction for requesting an atomic store of the target block of data from the registers to the memory system and for requesting that a response indication be written to a target register to provide an indication of whether the atomic store was successful or failed:

allocating a response tracking structure entry for one of a plurality of mapped store micro-operations generated in response to the single-copy-atomic-store-with-response instruction, and skipping allocating of the response tracking structure entry for remaining mapped store micro-operations of the plurality of mapped store micro-operations other than said one of the plurality of mapped store micro-operations; and following receipt of a success/failure indication from the memory system, using information specified in the response tracking structure entry to control writing of the response indication to the target register.

15. A non-transitory computer-readable medium to store computer-readable code for fabrication of an apparatus comprising:

instruction decoding circuitry to decode instructions to generate micro-operations; and processing circuitry to perform data processing operations in response to the micro-operations; in which:

the processing circuitry comprises load/store circuitry to process load/store micro-operations for transferring data between registers and a memory system, the load/store circuitry having a load/store data path to receive store data read from at least one register in response to a store micro-operation or to output load data to be written to at least one register in response to a load micro-operation;

in response to a single-copy-atomic load/store instruction for requesting an atomic transfer of a target block of data between the memory system and the registers, where the target block of data has a given size greater than a maximum data size supported for a single load/store micro-operation by the load/store data path, the instruction decoding circuitry is configured to map the single-copy-atomic load/store instruction to a plurality of mapped load/store micro-operations each for requesting transfer of a respective portion of the target block of data; and in response to the plurality of mapped load/store micro-operations mapped from the single-copy-atomic load/store instruction by the instruction decoding circuitry, the load/store circuitry is configured to:
  trigger issuing of a shared memory access request to the memory system to request the atomic transfer of the target block of data of said given size to or from the memory system, where the shared memory access request is shared between the plurality of mapped load/store micro-operations; and
  trigger separate transfers of respective portions of the target block of data over the load/store data path in response to the plurality of mapped load/store micro-operations; and when the single-copy-atomic load/store instruction is a single-copy-atomic-store-with-response instruction for requesting an atomic store of the target block of data from the registers to the memory system and for requesting that a response indication be written to a target register to provide an indication of whether the atomic store was successful or failed:
  the load/store circuitry is configured to allocate a response tracking structure entry for one of a plurality of mapped store micro-operations generated by the instruction decoding circuitry in response to the single-copy-atomic-store-with-response instruction, and to skip allocating the response tracking structure entry for remaining mapped store micro-operations of the plurality of mapped store micro-operations other than said one of the plurality of mapped store micro-operations; and
  following receipt of a success/failure indication from the memory system, the load/store circuitry is configured to use information specified in the response tracking structure entry to control writing of the response indication to the target register.

* * * * *